(12) United States Patent
Halpern et al.

(10) Patent No.: US 7,466,689 B1
(45) Date of Patent: Dec. 16, 2008

(54) PACKET NETWORK BASED EMERGENCY BACKUP TELEPHONE SYSTEM

(75) Inventors: Ian Halpern, Washington, DC (US); John Piescik, Vienna, VA (US); Joseph Siegrist, Vienna, VA (US)

(73) Assignee: Art Technology Group, Inc., Cambridge, MA (US)

( * ) Notice: Subject to any disclaimer, the term of this patent is extended or adjusted under 35 U.S.C. 154(b) by 1475 days.

(21) Appl. No.: 10/288,463

(22) Filed: Nov. 6, 2002

Related U.S. Application Data

(60) Provisional application No. 60/331,013, filed on Nov. 6, 2001.

(51) Int. Cl.
  *H04L 12/66* (2006.01)
(52) U.S. Cl. .................. 370/352; 370/401; 379/88.18
(58) Field of Classification Search ......... 370/352–356, 370/401, 404, 389, 392; 379/88.18
  See application file for complete search history.

(56) References Cited

U.S. PATENT DOCUMENTS

| | | | |
|---|---|---|---|
| 6,026,087 A | 2/2000 | Mirashrafi et al. | |
| 6,212,192 B1 | 4/2001 | Mirashrafi et al. | |
| 6,411,802 B1 * | 6/2002 | Cardina et al. | 379/2 |
| 6,529,475 B1 * | 3/2003 | Wan et al. | 370/231 |
| 6,771,741 B2 * | 8/2004 | Kliland | 379/39 |
| 2001/0038624 A1 | 11/2001 | Greenberg et al. | |

* cited by examiner

*Primary Examiner*—Suhan Ni
(74) *Attorney, Agent, or Firm*—DLA Piper LLP (US)

(57) ABSTRACT

In an emergency backup telephone system, members of an enterprise use their personal computers to log into an emergency communications web page. Upon logging in, software that enables the personal computer to act as a webphone is automatically downloaded. This software allows a person to initiate a call from personal computer to a conventional PSTN number destination using a PSTN gateway, or to another party's computer at a specified URL using VoIP telephony. Upon logging in, an authoritative index of employees reachable via the backup system updated to include information such as a phone number and/or IP address where the member can be reached in order to allow calls originating from the PSTN to be routed to the member's computer. The index is made available to other members of the enterprise via the enterprise's intranet, and, in some embodiments, to the public via a web page on the internet and/or email.

3 Claims, 4 Drawing Sheets

Softphone User Interface Example

Web Voice Card Example

Figure 4

Emergency Communications Services Web Site

| CONTACT ACME EMPLOYEES Click this link to access our employee directory and call our employees using your telephone (if available) or an Internet-connected personal computer.  | Current Communications News Acme's Metropolis office is reachable via Internet phone service during telephone outages there... |

ACME Metropolis Employees: Register here to download Emergency Communications Softphone and create Web Voice Cards... Employees Only Login Required

PACKET NETWORK BASED EMERGENCY BACKUP TELEPHONE SYSTEM

The present application claims the benefit of previously filed U.S. provisional application Ser. No. 60/331,013, filed Nov. 6, 2001, the contents of which are hereby incorporated herein by reference.

FIELD OF THE INVENTION

The invention is related generally to telephony and more particularly to an emergency backup telephone system that utilizes packet switched networks in addition to or in place of circuit switched networks.

DISCUSSION OF THE BACKGROUND

As highlighted by recent terrorist attacks on major cities, the public switched telephone network and cellular networks are vulnerable to significant service disruptions and discontinuities when large-scale disasters destroy key facilities. In contrast, Internet-based communications leverage the failure-resistant architecture of the Internet, thereby achieving higher reliability and survivability under adverse conditions.

Numerous products enable end users to communicate with others using voice over internet protocol (VOIP) technology. While these products serve various consumer and internet commerce functions, none are engineered to provide features needed for enterprises to provide continuity of operations in emergency situations. These features include means for dynamically creating or updating an authoritative index of members of the enterprise (e.g., employees) reachable using backup telecommunications systems, methods for routing calls from the public switched telephone network (PSTN) to these members, methods for routing calls within the enterprise to these members, and methods for enabling outside parties to reach these members using either Internet-connected computing devices or portions of the PSTN that are in working order.

SUMMARY OF THE INVENTION

The invention meets the foregoing need to a great extent by providing a method and process for both inbound and outbound telecommunications services for enterprises such as businesses and other organizations on an emergency basis, leveraging the internet to provide rapid startup, continuity of operations, and the features needed for internal and external communications requirements of the enterprise. The invention includes processes and methods for pre-establishing backup telephone service accounts, enabling authorized users to identify themselves to this system during an emergency or communications failure, dynamically creating and/or updating an authoritative index of members reachable using backup telecommunications systems, providing means for authorized users/members to place and receive telephone calls via the world wide web, providing means for parties to reach members via the public switched telephone network and/or the internet, and providing means for authorized members to connect with parties utilizing functioning parts of the PSTN.

In one aspect of the invention, members of an enterprise or organization, such as employees of a corporation, use their personal computers to log into an emergency communications web page. Upon logging in, software that enables the personal computer to act as a webphone is automatically downloaded. This software allows a person to initiate a call from personal computer to a conventional PSTN number destination using a PSTN gateway, or to another party's computer at a specified URL (uniform resource locator), SIP (session initiation protocol) destination, or H.323 alias ID, using VoIP telephony. Upon logging in, an authoritative index of employees reachable via the backup system is also updated to include information such as a phone number or a URL, SIP destination or H.323 alias ID where the member can be reached in order to allow calls originating from the PSTN to be routed to the member. The index is made available to other members of the enterprise via the enterprise's intranet, and, in some embodiments, to the public via a web page on the internet and/or via email.

In the event the member only specifies a PSTN extension on which he or she can be reached, or designates the PSTN extension as a preferred destination for incoming calls, an incoming call is forwarded to the PSTN using conventional call forwarding techniques. In the event that the member only specifies a URL to which VoIP call are to be directed or designates the URL, SIP destination or H.323 alias ID as a preferred destination for incoming calls (which may occur, for example, when the member is working from home and has only a single PSTN phone line which much be used for his or her internet connection, or when the member's phone lines are down but he has an internet connection via a cable modem), a PSTN gateway is used to bridge the incoming call from the PSTN to the internet. In one embodiment of the invention, one of a block of numbers serviced by a PSTN gateway is assigned to the member's URL, SIP destination or H.323 alias ID such that when an incoming call directed toward that number is received by the PSTN gateway, the PSTN gateway automatically bridges the call to the URL, SIP destination or H.323 alias ID associated with the member to whom that number has been assigned. In another embodiment, a single PSTN telephone number is provided to all parties, and an interactive directory that allows a user to enter, for example, the first three or four letters of the name of the desired member is made available to the caller to specify the member to whom they wish to speak. Once the member is identified by the caller, a PSTN-to-VoIP call is bridged via the PSTN gateway.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein:

FIG. 4 is a screen shot of an emergency communications services web site according to an embodiment of the invention.

DETAILED DESCRIPTION

The present invention will be discussed with reference to preferred embodiments of emergency backup communications systems. Specific details, such as types of switches and gateways, and methods for publishing emergency telephone numbers, are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

The invention is believed to be particularly applicable to a company with employees and will therefore be discussed in that context. However, it should be understood that the invention is not limited to companies but rather is applicable to many different kinds of enterprises.

In a preferred embodiment, a corporate telecommunications manager or a sales agent enrolls a company for an emergency backup telephone service using a Web-based enrollment process. This process enables the company to establish an account for such services and to create a customizable emergency communications web page for its employees to use in the event emergency communications services are required. At the company's option, headsets or handsets that plug into personal computers or similar computing devices are distributed to employees to assure that their computers are ready to support internet based voice communications.

There are many different situations in which emergency telecommunications services might be required. One example of such a scenario is a natural disaster or terrorist incident in which the company's physical plant, including its telecommunications equipment, is destroyed. In this situation, employees may be asked to work from home or from a temporary, remote location away from the plant. Such employees may have only a single telephone line available to them with which they can take and place telephone calls and/or access the internet via a modem connection. Another example is the destruction of a PSTN local office serving the enterprise.

Figure 1:
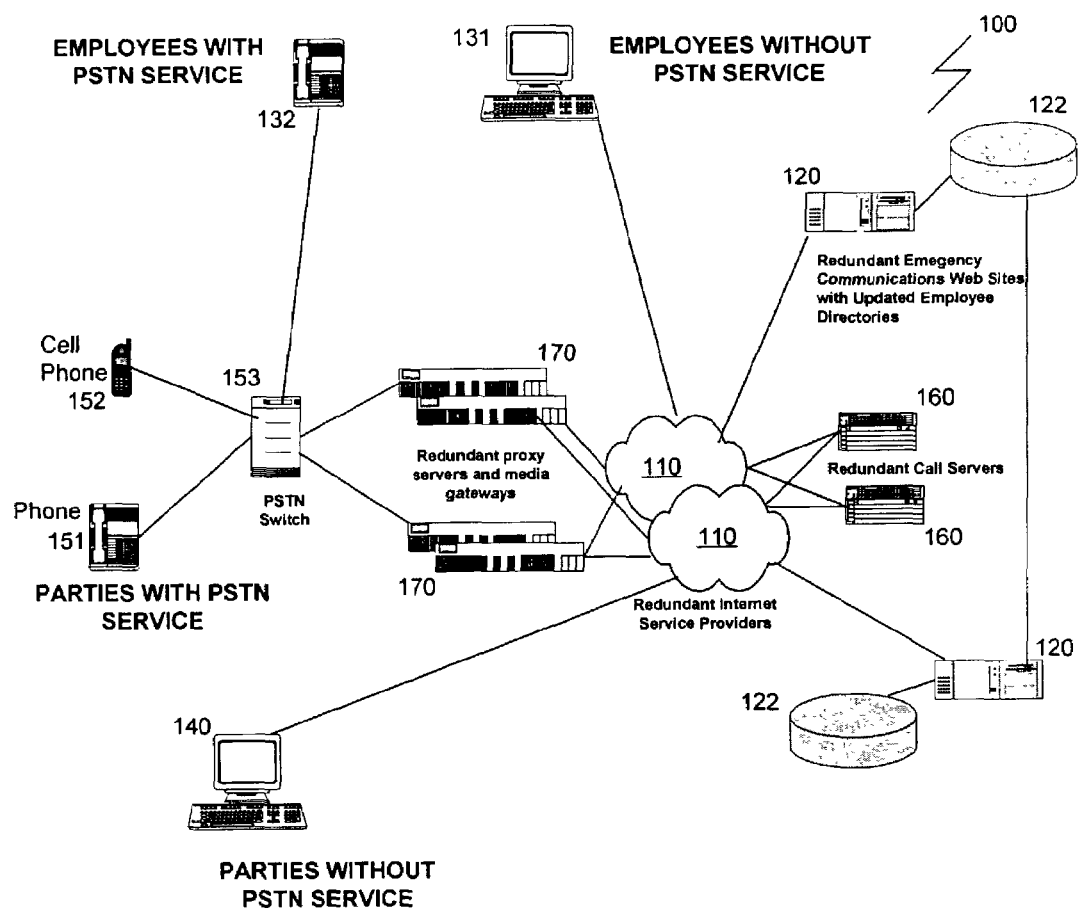
FIG. 1 is a hardware block diagram of an emergency backup telephone system according to an embodiment of the invention.

An example of an emergency backup telephone system 100 is illustrated in FIG. 1. To assure continuity of operations, the system 100 includes multiple proxy servers, gateway servers, and packet based networks so that single points of failure outside any local area network connecting components of the system 100 are eliminated. The system 100 includes web servers 120 connected to the internet 110. Storage devices 122, which store redundant databases that include the index of employees registered with the system 100 in an emergency, are connected to the web servers 120. Also connected to the internet 110 is an employee computer 131, a third party computer 140, and a plurality of proxy servers/media gateways 170. A PSTN switch 153 is connected to the media gateways 170. A telephone 132 corresponding to an employee with PSTN service, and a conventional phone 151 and a cell phone 152 corresponding to third parties with PSTN service are connected to the switch 153. It should be understood that the switch 153 in FIG. 1 forms part of the system 100 and that corresponding switches and other equipment (e.g., base stations) that connect the phones 132, 151 and cell phone 152 to the system 100 are not shown in FIG. 1 for the sake of simplicity. It should be further understood that the employee computer 131 and the employee telephone 132 may or may not be associated with the same employee.

In the event of a communications disruption, employees would access the emergency communications web page (such as the web page shown in FIG. 4) hosted on servers 120 with their personal computers by entering from their company's intranet site (which may or may not be hosted on the servers 120). This approach would enable the company to validate the employee's identity using their standard network access authentication approaches. The information required to implement the aforementioned authentication approaches (e.g., the employee's user name and password) may also be stored on the server 120 in advance in case the company intranet is unavailable.

Figure 2:
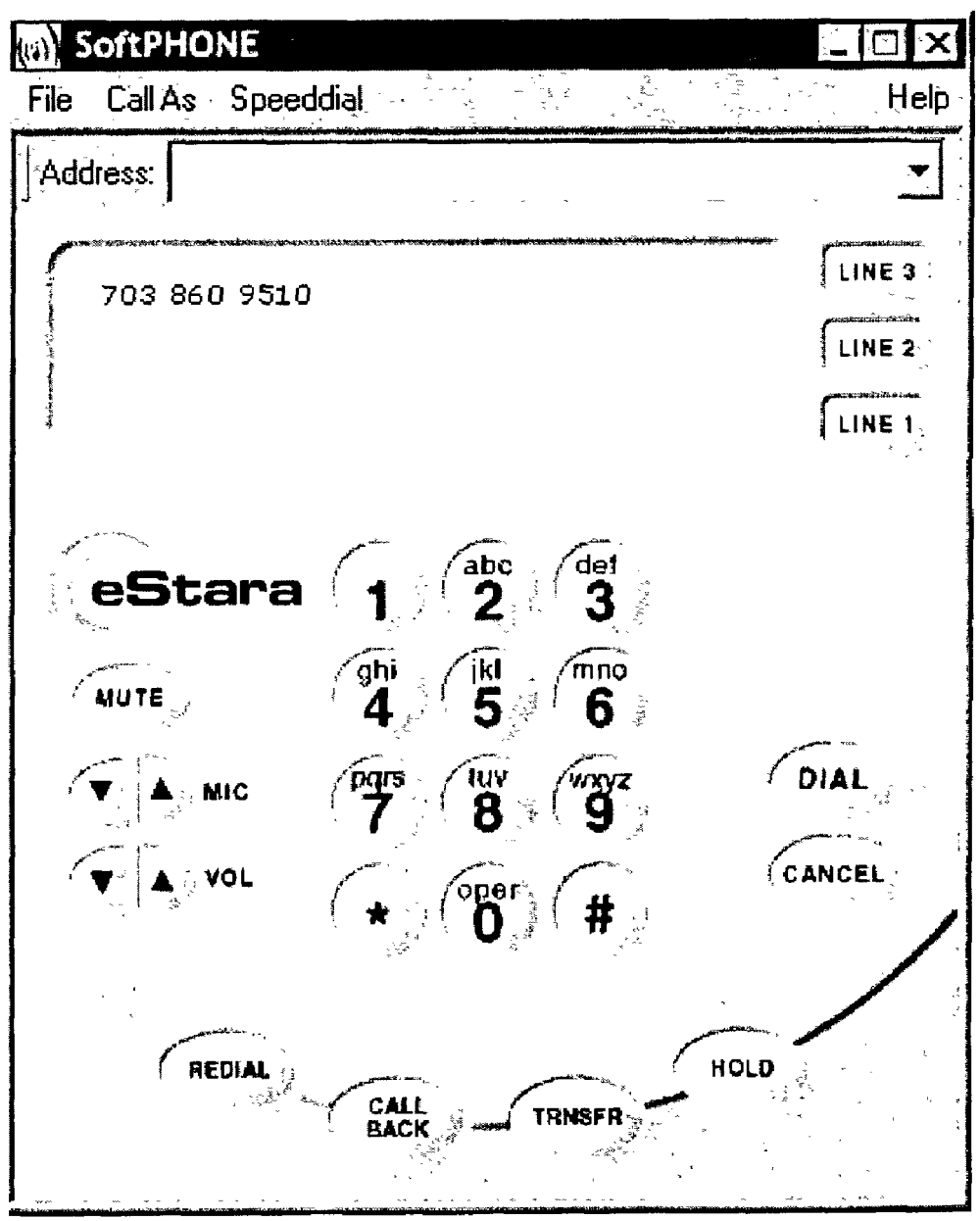
FIG. 2 is a screen shot showing a user interface for an internet telephony application according to an embodiment of the invention.

At the web site, the employee initiates emergency communications services by registering online with a proxy server 170 that correlates the employee's internet address with their (non-functioning) business telephone extension number(s). The registration process will automatically update (or in some cases, create) an index of employees reachable using the emergency backup system, providing both remotely-located PSTN extensions and IP addresses or other Internet-based locator information (such as SIP destinations) to enable routing of calls originating from either the Internet or the PSTN to the employees using the system. The employee index is preferably stored in redundant databases 122. At this time, a VOIP application (software that enables a computer to act as an Internet telephone in a manner well known in the art), for example the SOFTPHONE™ application available from the assignee of the present application, eStara, Inc, is automatically downloaded to the employee's personal computer if necessary. An example of a SOFTPHONE™ user interface is illustrated in FIG. 2.

Once registered, the employee initializes the VOIP application on their PC 131. The VOIP application uses VOIP protocols to provide outbound voice communications services based on user inputs and/or the use of an address book on the computer 131. Outbound PSTN calls, such as calls to a conventional phone 151 or cell phone 152 may be established through the use of media gateways 170 in a manner well known in the art. Outbound VoIP calls can be made to other PCs 140 (including PCs corresponding to third parties or other employees) equipped with compatible VOIP applications using direct computer-to-computer media streaming protocols. For those employees with available PSTN service, calls from PSTN phones 132 to other PSTN phones 151, 152 can be routed through switch 153 or through any other PSTN switch (not shown in FIG. 1) available to the employee.

Figure 3:
FIG. 3 is a screen shot of a web voice card for notifying a party of a backup public switched telephone number and a backup URL where an employee can be reached in an emergency according to an embodiment of the invention.

The system 100 can also support incoming calls from other employees and/or third parties. In this situation, it may be necessary or desirable to notify other employees and/or third parties of the PSTN extension and/or URL, SIP destination or H.323 alias ID at which the employee can be reached. The user employees may communicate this information through e-mail or web pages (which may be hosted on web servers 120) to potential callers with an e-mail or web page containing a web voice link. Such a link, as described in U.S. Pat. Nos. 6,026,087, 6,212,192 (licensed by the applicant) and/or U.S. patent application Ser. No. 09/771,993 would initiate the download of a thin-client voice application capable of enabling the caller's multimedia computing device to establish a voice connection directly to the employee's VOIP application, or permit the caller to select a telephone callback mode if the PSTN is available at the caller's site. An exemplary web voice card, which may be included in an email, containing a link that automatically establishes VoIP communications from the recipient's PC to the PC of the sender of the email is illustrated in FIG. 3.

Inbound communications originating from compatible VOIP applications (such as communications from other employees of the company using the emergency communications system) that are directed toward an employee PC 131 are accommodated with direct computer to computer media streaming protocols supported by the VOIP application.

Inbound VoIP communications originating from a third party PC 140 that are directed toward an employee PSTN extension are handled through a PSTN gateway 170 under the control of call servers 160 in a manner similar to that described in the aforementioned U.S. patents and in FIGS. 10 and 11 and the accompanying text of the aforementioned co-pending U.S. patent application Ser. No. 09/771,993, the contents of which are hereby incorporated by reference herein. In some embodiments, callback (whereby a user clicks on a link, which causes a message to be sent to the employee computer 131 with a phone number of a PSTN extension at which the party associated with PC 140 wishes to receive a PSTN phone call) is available in addition to or in place of a pure VoIP call.

Inbound communications directed toward an employee's conventional PSTN phone 132 are also supported. Inbound communications originating from a conventional PSTN phone 151 or a cell phone 152 may be directed via the switch 153 (or any other PSTN switch) to the employee's phone 132 in the conventional manner or by using call forwarding.

Inbound communications directed toward an employee's PC 131 are likewise supported. In one embodiment, a single employee is associated with a single telephone number from a block of telephone numbers associated with one or more gateways 170. This unique telephone number is what is displayed on the website hosted by server 120 and/or in the email (and/or the voice web card) sent to the calling party. When an incoming PSTN call is received on switch 153, the call is directed to the gateway 170 (which is preferably a SIP gateway), which bridges the PSTN call to a VoIP call at the URL, SIP destination or H.323 alias ID associated with the employee that has been assigned to the telephone number to which the incoming call has been directed.

A second way in which an incoming PSTN call may be directed to an employee's PC 131 is through the use of an interactive voice response system (IVR), under the control of a proxy server associated with gateway 170, that allows the incoming caller to specify the employee with whom they wish to speak. Such an embodiment is advantageous in that it does not require the maintenance of a block of telephone numbers (which can be expensive) for use in an emergency situation. This technique allows incoming calls to be directed toward a single telephone number. In one embodiment, when such a call is received, the IVR provides the caller with the option of entering the letters of the desired employee's name, such as by pressing the key associated with that letter. Thus, a caller wishing to speak with employee Jones would press the 5, 6, 6, 3 and 7 keys on their keypad to specify employee Jones. The IVR, which may be controlled by and/or implemented on a proxy server associated with gateway 170, then accesses the entry for employee Jones in the index in database 122. This entry provides the URL at which VoIP calls to employee Jones are to be directed. The call is then directed toward the PSTN gateway 170, which is directed to bridge the PSTN call to a VoIP call to employee Jones using the URL, SIP destination or H.323 alias ID obtained from the database 122. One advantage of this embodiment is that it does not require the communication of any employee-specific information (e.g., an email with the employee's name and destination information) to the calling party. Thus, this embodiment may be used by a calling party that may have viewed the website or heard a commercial on the radio or TV disclosing the emergency telephone number. Furthermore, this embodiment may be used when no information of any kind is communicated to the calling party and the calling party may not even be aware that their call is being processed by the emergency phone system.

For example, the company may direct its regular telephone service provider to re-direct all incoming calls (e.g., 800 number calls) to the emergency backup system, which then re-directs these calls to the employee identified by the calling party using the IVR. When this technique is used in a call center context, the system 100 may optionally direct the call to call to one of a group of employees who handle such calls (based, for example, on the nature of the inquiry from the calling party as specified by the caller using the IVR system), or may select an available employee at random, rather than having the calling party identify a particular employee.

While the invention has been described with respect to certain specific embodiments, it will be appreciated that many modifications and changes may be made by those skilled in the art without departing from the spirit of the invention. For example, any device capable of acting as a VOIP phone may be used in place of the computer equipped with a VOIP software application discussed above. It is intended therefore, by the appended claims to cover all such modifications and changes as fall within the true spirit and scope of the invention.

What is claimed is:

1. A method for providing backup telephone services to members of an enterprise, the method comprising the steps of:
   accepting availability information from at least one member of an enterprise in the event that the enterprise's regular telephone service becomes unavailable, the availability information including an identification and destination information associated with the member;
   providing a software application that enables a computer associated with the member to act as a webphone;
   distributing the identification and the destination information to a calling party;
   accepting an incoming call from the calling party; and
   connecting the incoming call to the member using the destination information; and
   wherein the destination information includes a Uniform Resource Locator ("URL") and the incoming call is a PSTN call.

2. The method of claim 1, further comprising the steps of:
   uniquely associating the member identification with a telephone number selected from a plurality of telephone numbers corresponding to a PSTN gateway;
   retrieving an identification of the member associated with the telephone number to which the incoming call was directed; and
   retrieving the URL associated with the member identification; and
   wherein the incoming call is connected to a voice over internet protocol (VOIP) call directed toward the URL associated with the member identification.

3. The method of claim 1, wherein the incoming call is directed toward a PSTN telephone number associated with a plurality of members, further comprising the steps of:
   accepting an indication from the calling party as to the member with whom the calling party wishes to speak; and
   retrieving the URL associated with member with whom the calling party wishes to speak based on the indication provided by the calling party;
   wherein the incoming call is connected to a VOIP call directed toward the URL.

* * * * *